A. J. DONOVAN AND F. POKORNY, JR.
METHOD OF ATOMIZING LIQUID FUEL.
APPLICATION FILED AUG. 5, 1922.
Reissued Nov. 21, 1922.
15,493.
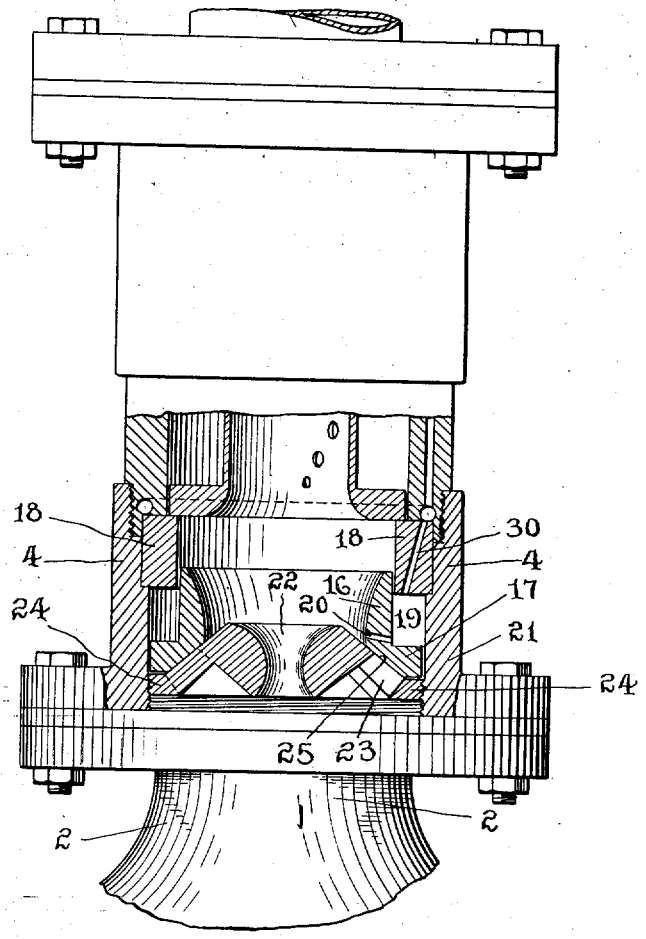
Arthur J. Donovan
and Frank Pokorny
Inventors
By their Attorneys
Fetherstonhaugh & Co.

Reissued Nov. 21, 1922. Re. 15,493

UNITED STATES PATENT OFFICE.

ARTHUR J. DONOVAN, OF ARDSLEY, AND FRANK POKORNY, JR., OF MAMARONECK, NEW YORK, ASSIGNORS, BY DIRECT AND MESNE ASSIGNMENTS, OF ONE-HALF TO SAID POKORNY AND ONE-HALF TO FRANCIS W. KEEGAN, OF NEW YORK, N. Y.

METHOD OF ATOMIZING LIQUID FUEL.

Original No. 1,290,523, dated January 7, 1919, Serial No. 229,909, filed April 22, 1918. Application for reissue filed August 5, 1922. Serial No. 579,953.

*To all whom it may concern:*

Be it known that we, ARTHUR J. DONOVAN and FRANK POKORNY, Jr., citizens of the United States, and residents, respectively, of Ardsley, in the county of Westchester, and Mamaroneck, in the county of Westchester, both in the State of New York have invented certain new and useful Improvements in Methods of Atomizing Liquid Fuel, of which the following is a clear and exact specification, reference being had to the accompanying drawing, which forms a part of this application.

This invention relates to a method of atomizing liquid fuel, and our present application, which is Division B of our application for reissue patent, Serial No. 378,254, filed May 1, 1920, and is directed to the impinging effect of separate streams of fuel mixture upon each other, to finely divide the fuel particles by the force in impaction thus provided, and in the confluence of the two streams, to set up a state of intermixture between the air and fuel most suitable for combustion.

The drawing represents, enlarged, a vertical sectional view of the device.

In the example of the mechanical device illustrated whereby our improved method may be practiced we have shown the same structure as that comprised in our co-pending reissue application, previously referred to, which is in the form of a governor, and includes a passage connecting an engine intake 1 with a carbureter 2.

This divisional application is not concerned primarily with the fuel mixture governing features of the structure represented in the drawing, and they will not therefore be described herein.

Those elements of the indicated structure which co-operate to perform the functions of this application include a piston element, which serves as a supply throttle and consists of an annulus 16, having a radial flange 17 at its lower portion, the periphery of said flange being slidable against the inner surface of portion 4 of the connecting passage, in the movement of said annulus, whose outer surface rides against the inner surface of a concentric member 18, in the functioning of said piston element.

Thus a chamber 19 is bounded by the annulus 16, its flange 17, the portion 4 and the under surface of member 18; said chamber being contractible and expansible with the movement of said annulus. An orifice, as 20, through the annulus 16, permits exhaustion of the chamber 19 under the aspiratory force of the motor, thus rendering said annulus responsive in movement to that influence. Normally the annulus 16 is seated upon a base, as 21, which may form part of a choke device, here shown as a Venturi tube 22, connected, as by radial arms 23, with a threaded portion 24, screwed into portion 4. When the annulus is seated, as stated, the spaces between the arms 23 are thereby covered and fuel mixture can then only be drawn through the venturi, flowing thus in restricted quantity, as for motor idling purposes; but when the annulus has been lifted up, then additional fuel passage is available through the spaces between the arms 23, and between the outer surface of the Venturi tube and the under surface of the annulus 16, the extent and capacity of the passage varying according to the degree to which the annulus is raised.

With the lift of supply throttle 16 fuel mixture is caused to flow between the inclined surface 25 of said supply throttle and the outer wall of the venturi, this fluid flow being accorded a convergent direction by the inward and upward angle of said inclined surface 25, so that in fact the volume of fluid enters the passage in conoidal form. Since at the same time fuel mixture is also flowing, under the same suction influence created by the engine in its aspiratory operation, through the axial orifice of the venturi, it follows that the two separate volumes of fluid admitted to the passage enter into impinging relation which results in a fuel pulverizing action, whereby the full particles in each volume become more finely subdivided and all are intimately intermingled in and dispersed throughout the combined volumes to constitute a highly combustible mixture. Also, due to the outwardly flared form of the venturi exit, the central stream of fluid mixture issuing therefrom tends to spread or diverge toward the other or convergent fuel mixture flow, which has the effect of intensifying the force of impact between the two volumes of fluid, thereby enhancing the value of the bombardment between the fluid streams in their fuel pulverizing and mixture making characteristics.

Variations within the spirit and scope of our invention are equally comprehended by the foregoing disclosure.

We claim:

The method of providing a continuous flow of fuel mixture to the intake manifold of an internal combustion engine, which consists in the creation of a central, diverging flow of said mixture, and also a concentric, converging flow of said mixture, and causing said flows of mixture to enter into impinging relation, whereby a fuel pulverizing and mingling effect is produced between said flows of fluid mixture.

Signed at White Plains, in the county of Westchester and State of New York, this 29th day of July, 1922.

ARTHUR J. DONOVAN. [L. S.]
FRANK POKORNY, JR. [L. S.]